(12) United States Patent
Rudnick

(10) Patent No.: US 7,561,024 B2
(45) Date of Patent: Jul. 14, 2009

(54) AD-HOC NETWORK ROUTING PROTOCOL INCLUDING THE USE OF FORWARD AND REVERSE MULTI-POINT RELAY (MPR) SPANNING TREE ROUTES

(75) Inventor: William Michael Rudnick, Pittsford, NY (US)

(73) Assignee: Harris Corporation, Melbourne, FL (US)

( * ) Notice: Subject to any disclaimer, the term of this patent is extended or adjusted under 35 U.S.C. 154(b) by 364 days.

(21) Appl. No.: 11/696,989

(22) Filed: Apr. 5, 2007

(65) Prior Publication Data

US 2008/0247335 A1 Oct. 9, 2008

(51) Int. Cl.
*G08B 9/00* (2006.01)
(52) U.S. Cl. .................. 340/286.01; 340/286.02; 340/539.1
(58) Field of Classification Search .......... 340/286.01, 340/286.02, 286.06, 286.14, 539.1; 370/236.1, 370/254, 256; 709/220, 227, 242; 380/285; 398/45, 49
See application file for complete search history.

(56) References Cited

U.S. PATENT DOCUMENTS

| | | | |
|---|---|---|---|
| 6,584,080 B1 | 6/2003 | Ganz et al. | 370/315 |
| 7,035,937 B2 * | 4/2006 | Haas et al. | 709/239 |
| 7,209,978 B2 * | 4/2007 | Thubert et al. | 709/242 |
| 7,305,459 B2 * | 12/2007 | Klemba et al. | 709/220 |
| 7,400,832 B2 * | 7/2008 | Beacham et al. | 398/45 |
| 7,522,731 B2 * | 4/2009 | Klemba et al. | 380/285 |
| 2002/0145978 A1 | 10/2002 | Batsell et al. | 370/238 |
| 2006/0039300 A1 * | 2/2006 | Ogier et al. | 370/254 |
| 2008/0075033 A1 * | 3/2008 | Shattil | 370/328 |

OTHER PUBLICATIONS

"The Optimized Link State Routing Protocol Version 2; Draft-IETF-Manet-OLSRV2-03.TXT," IETF Standard-Working-Draft, Internet Engineering Task Force, IETF, CH, vol. Manet, No. 3, Feb. 1, 2007, XP015049524, ISSN: 0000-0004.

* cited by examiner

*Primary Examiner*—Van T. Trieu
(74) *Attorney, Agent, or Firm*—Allen, Dyer, Doppelt, Milbrath & Gilchrist, P.A.

(57) ABSTRACT

A method of operating an ad-hoc network having a plurality of wireless nodes includes operating the wireless nodes using a routing protocol, such as OLSR, so that the wireless nodes store forward multi-point relay (MPR) spanning tree routes and reverse MPR spanning tree routes. A first wireless node communicates with a second wireless node using a reverse MPR spanning tree route. The method further includes determining whether the reverse MPR spanning tree route has become unavailable between the first and second wireless nodes and that no other reverse MPR spanning tree route has yet become available, and, if so, using at least portions of a forward MPR spanning tree route for communication between the first and second wireless nodes. The symmetric OLSR approach may be effective in avoiding unnecessary route drops caused by the interaction between distribution-of-topology-change-information conditions and exclusively routing via the destination node's reverse-MPR-spanning tree.

18 Claims, 4 Drawing Sheets

US 7,561,024 B2

AD-HOC NETWORK ROUTING PROTOCOL INCLUDING THE USE OF FORWARD AND REVERSE MULTI-POINT RELAY (MPR) SPANNING TREE ROUTES

FIELD OF THE INVENTION

The present invention relates to the field of communications, and, more particularly, to wireless communications in ad-hoc networks and related methods.

BACKGROUND OF THE INVENTION

The Optimized Link State Routing Protocol (OLSR) has been developed for mobile ad hoc networks. It operates as a table driven and proactive protocol, and thus exchanges topology information with other nodes of the network regularly. The nodes which are selected as a multipoint relay (MPR) by some neighbor nodes announce this fact periodically in their topology control (TC) messages. Thereby, a node announces to the network, that it has reachability to the nodes which have selected it as an MPR. In route calculation, the MPRs are used to form the route from a given node to any destination in the network. The protocol uses the MPRs to facilitate efficient flooding of TC messages in the network.

More specifically, OLSR operates by maintaining an internal data structure within each node of local 1-hop and 2-hop neighbors, overall network connectivity, and a routing table. OLSR generates and maintains these internal data structures by exchanging three kinds of OLSR over the air (OTA) messages including HELLO messages, TC messages, MID (multiple interface declaration) messages and HNA (host and network association) messages.

The internal data structures are used in the network to populate a relay cache with next-hop node IDs indexed by final-destination node ID. A table pairing network MAC addresses and IP addresses is also maintained. HELLO messages are exchanged exclusively between 1-hop neighbors. For example, each node may generate HELLO messages every 2 seconds. They serve to establish and maintain the 1- and 2-hop neighborhood connectivity state parts of a node's internal OLSR data structures. Exchange of 1-hop neighborhood information between 1-hop neighbors serves to inform each node of its 2-hop neighborhood. This, in turn, allows each node to select MPR nodes that are used for efficient message-flooding (i.e., network broadcast). For each node, the MPRs implement a spanning tree covering the network.

Also, each node may generate TC messages that flood the network via its MPR spanning tree, typically every 5 seconds. TC messages distribute each node's relevant 1-hop neighborhood information in the form of its MPR selectors (1-hop neighbors who selected it as their MPR) to all other nodes in the network. This information is then used by each node to build its routing table. The OLSR routing table is used to fill each node's relay cache. Each node generates HNA messages that flood the network via its MPR spanning tree, e.g. every 5 seconds. HNA messages distribute each node's network mask and MAC address. HNA message information is used to fill each node's MAC address to IP address table.

Conventional OLSR may drop routes during network topology transitions. The causes may include TC messaging forwarding factors such as each node trying to minimize MPRs selected, TC messages distributed via MPR spanning trees, TC/HNA message forwarding ordering, each node's OLSR timers being de-correlated, TC message distribution race conditions and/or reverse MPR spanning tree routing. When TC messages fail to arrive for the aforementioned reasons, network topology segments can timeout and be dropped.

As mentioned above, MPR spanning trees are used by OLSR to efficiently flood a node's messages through the entire network. When a node generates a message to be flooded, it broadcasts the message to its 1-hop neighbors. Each 1-hop neighbor selected by the node as an MPR, in turn, retransmits the message. Because of how MPRs are selected, this 1-hop-MPR-neighbor forwarding gives coverage of all 2-hop neighbors. Each node receiving the message checks to see if the message has already been received, i.e., if it was a duplicate. If a duplicate was received, then the message is discarded. If a non-duplicate was received and the transmitting node had selected the receiving node as one of its MPRs, then the receiving node retransmits (i.e., forwards) the message. The retransmissions continue until no more retransmissions (forwardings) occur. Loops are avoided by discarding duplicates. The flooding process terminates when the flooded message has been delivered to all end nodes (or leaves) of the originating node's MPR spanning tree.

OLSR includes routing via reverse MPR-spanning-trees. Conventional OLSR constrains computed routes to lie along reverse paths in the destination's MPR spanning tree. Each node's MPR spanning tree should cover the entire network, i.e. that is what makes it a spanning tree. Thus any node in the network can route to a destination node by plotting a route from itself to the destination backward through branches in the destination node's MPR spanning tree, by reversing the path used by the destination node's flooded messages to reach the source node.

OLSR's reverse-MPR-spanning-tree routing works well when the network is stable, i.e. when the OLSR topology-distribution mechanism has converged so that each node in the network has the same network-level view of network topology. But during a period in which a node's local connectivity changes and MPR selection changes are being distributed across the network, problems can arise.

SUMMARY OF THE INVENTION

In view of the foregoing background, it is therefore an object of the present invention to provide a routing protocol in an ad-hoc network including the use of forward and reverse MPR spanning tree routes.

This and other objects, features, and advantages in accordance with the present invention are provided by a method of operating an ad-hoc network including a plurality of wireless nodes, the method including operating the wireless nodes using a routing protocol, such as OLSR, wherein the wireless nodes store forward multi-point relay (MPR) spanning tree routes and reverse MPR spanning tree routes, and wherein a first wireless node communicates with a second wireless node using a reverse MPR spanning tree route. The method may further include determining whether the reverse MPR spanning tree route has become unavailable between the first and second wireless nodes and that no other reverse MPR spanning tree route has yet become available, and, if so, including at least portions of a forward MPR spanning tree in the route for communication between the first and second wireless nodes.

The wireless nodes may add routes to one-hop neighbor nodes to a route table, and select one-hop neighbor nodes as MPRs to retransmit messages to two-hop neighbor nodes. Storing forward MPR spanning tree routes and reverse MPR spanning tree routes may further include adding new routes to the route table based upon symmetric (i.e., forward or reverse) use of MPR-to-new-destination-node links.

Another aspect is directed to an ad-hoc network including a plurality of wireless nodes. Each wireless node may comprise a controller and a wireless communications device cooperating therewith to operate the wireless node using a routing protocol, e.g. OLSR, including storing forward MPR spanning tree routes and reverse MPR spanning tree routes and combinations of these, and to communicate with the other wireless nodes using reverse MPR spanning tree routes. The node may determine that a respective reverse MPR spanning tree route to another one of the plurality of wireless nodes has become unavailable, and, if so, may include a portion of a forward MPR spanning tree route as part of the route for communication to such wireless node.

Another aspect is directed to a wireless node for operation with a plurality of mobile nodes within an ad-hoc network. The wireless node may include a controller and a wireless communications device cooperating therewith to operate the wireless node using a routing protocol, e.g. OLSR, including storing forward MPR spanning tree routes and reverse MPR spanning tree routes, and to communicate with the other wireless nodes using reverse MPR spanning tree routes, and determining whether a respective reverse MPR spanning tree route to another one of the plurality of wireless nodes has become unavailable, and, if so, including a portion of a forward MPR spanning tree route as part of the route for communication to such wireless node.

DETAILED DESCRIPTION OF THE PREFERRED EMBODIMENTS

Figure 1:
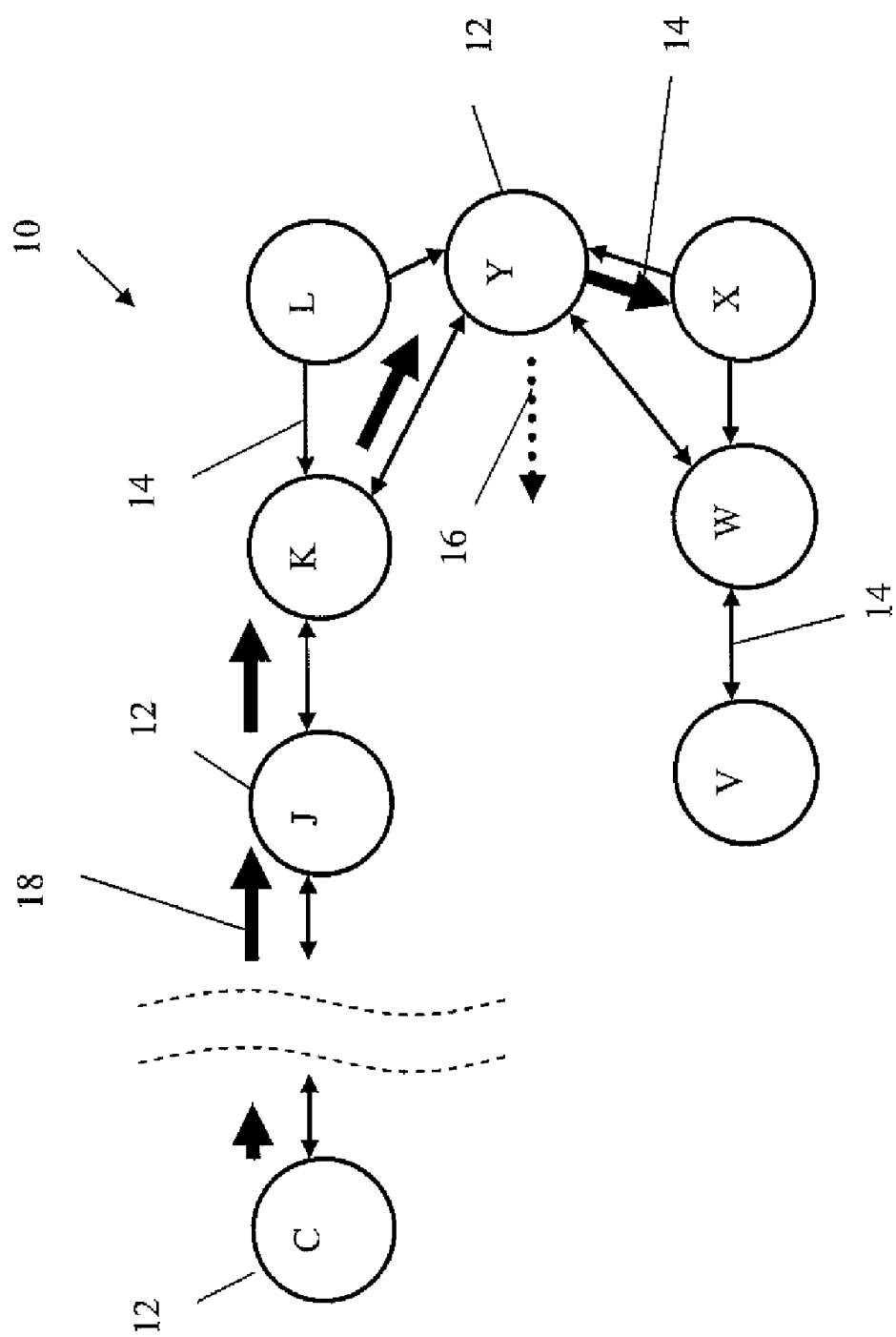
FIGS. 1 and 2 are schematic snapshot views of an ad-hoc network operating under a symmetric link state routing protocol in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It is appreciated by one skilled in the art that the embodiments described herein are not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc., for example. Further, the embodiments are not limited for use with a specific PHY or radio type, but are applicable to other compatible technologies as well.

Note that throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As discussed above, the Optimized Link State Routing Protocol (OLSR) for mobile ad hoc networks operates as a table driven and proactive protocol, and thus nodes exchange topology information with other nodes of the network regularly. In route calculation, the MPRs are used to form the route from a given node to any destination in the network. OLSR operates by maintaining an internal data structure, within each node, of local 1-hop and 2-hop neighbors, overall network connectivity, and a routing table. Exchange of 1-hop neighborhood information between 1-hop neighbors serves to inform each node of its 2-hop neighborhood. This, in turn, allows each node to select MPR nodes that are used for efficient message-flooding (i.e., network broadcast). For each node, the MPRs implement a spanning tree covering the network.

MPR spanning trees are used by OLSR to efficiently flood a node's messages through the entire network. When a node generates a message to be flooded, it broadcasts the message to its 1-hop neighbors. Each 1-hop neighbor selected by the node as an MPR, in turn, retransmits the message. Because of how MPRs are selected, this 1-hop-MPR-neighbor forwarding gives coverage of all 2-hop neighbors. The retransmissions continue until no more retransmissions (forwardings) occur. Loops are avoided by discarding duplicates. The flooding process terminates when the flooded message has been delivered to all end nodes (or leaves) of the originating node's MPR spanning tree.

OLSR includes routing via reverse MPR spanning trees Conventional OLSR constrains computed routes to lie along reverse paths in the destination's MPR spanning tree. Each node's MPR spanning tree should cover the entire network, i.e. that is what makes it a spanning tree. Thus any node in the network can route to a destination node by plotting a route from itself to the destination backward through branches in the destination node's MPR spanning tree, by reversing the path used by the destination node's flooded messages to reach the source node.

Figure 2:
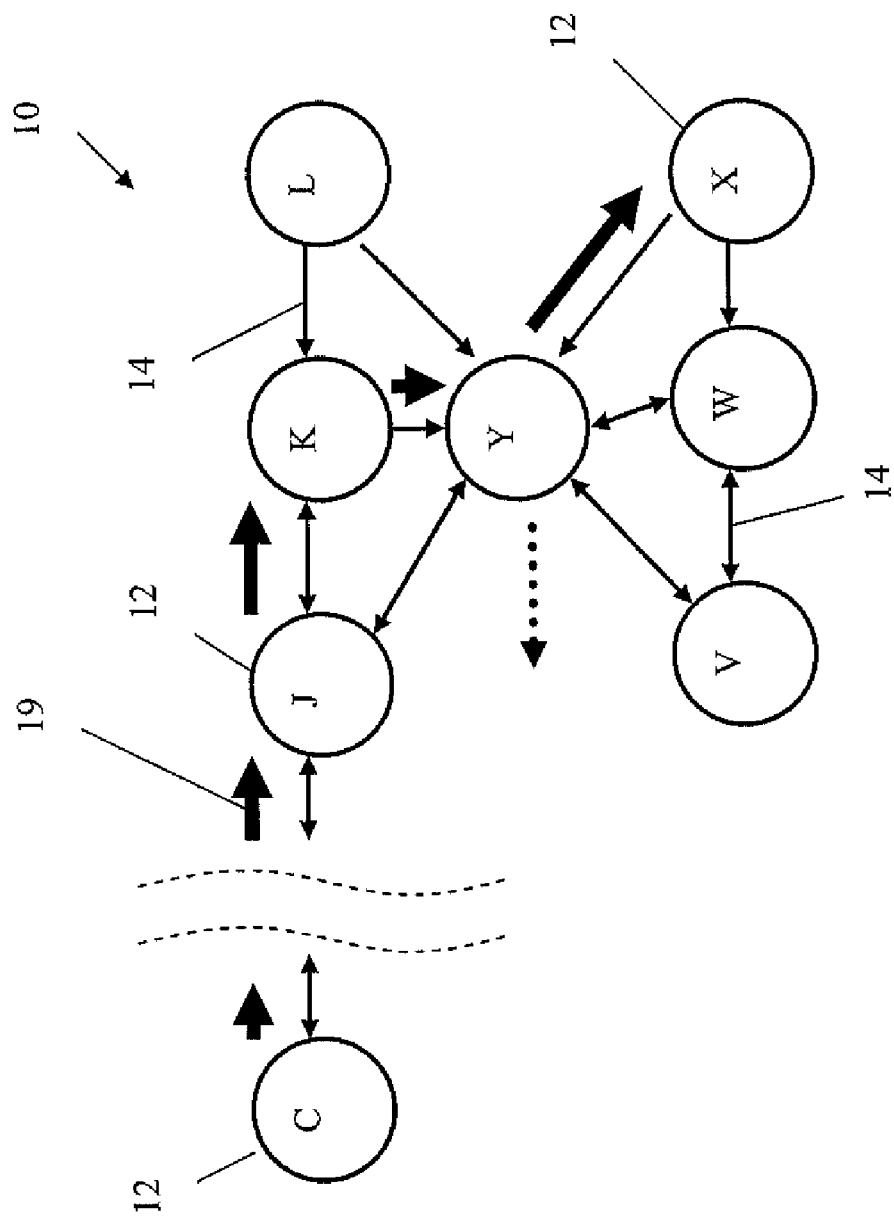

FIGS. 1 and 2 are snapshots of an example network 10 of mobile nodes 12 operating together and showing MPR selection 14 defining MPR spanning trees at different instants of time. The network 10 includes the plurality of mobile nodes 12, such as laptop computers, personal digital assistants (PDAs), digital voice and data radios, or mobile phones, that are connected by wireless communication links as would be appreciated by the skilled artisan. A link is the basic connection in a network and is simply the physical link between any two nodes 12. Information describing the node includes a node ID (IP address, ATM address, MAC address, etc.) and positional information if available. Such a network could be a mobile ad-hoc wireless communications system. Such examples of networks are set forth in commonly assigned U.S. Pat. Nos. 6,763,013; 6,754,192; and U.S. Pat. Publication Nos. 2005/0053003 and 2004/0203820, the disclosures which are incorporated by reference in their entirety.

Figure 3:
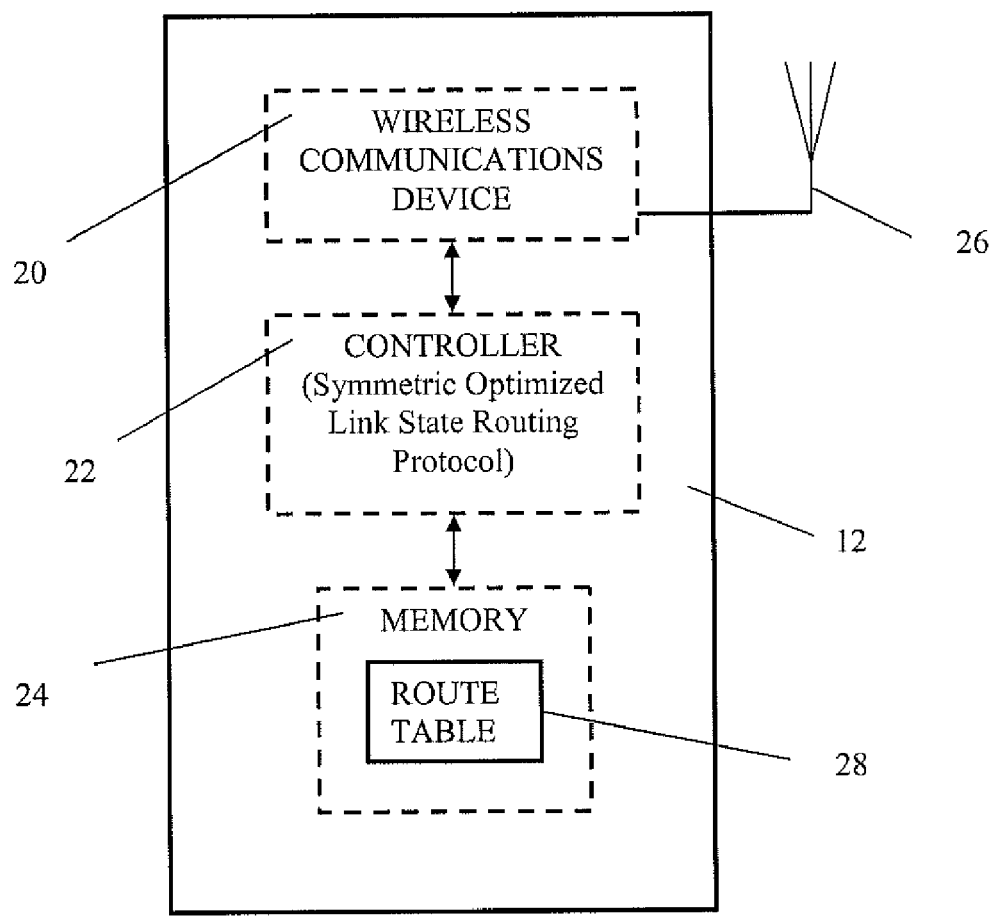
FIG. 3 is a schematic block diagram illustrating an example of a wireless node for use in the ad-hoc network of FIGS. 1 and 2.

Referring more specifically to FIG. 3, the nodes 12 may be any suitable type of mobile device capable of communicating within a MANET, including a wireless communications device 20, for example, and other devices which will be appreciated by those of skill in the art. Of course, it will also be appreciated that certain nodes 12 may optionally be connected to a fixed communication infrastructure in some applications, if desired.

The mobile nodes 12 further illustratively include a controller 22, the operation of which will be described below. By way of example, the controller 22 may be implemented using microprocessors, memory, software, etc., as will be appreciated by those of skill in the art. An associated memory 24 may also be included. Furthermore, the wireless communications device 20 may include wireless modems, wireless local area network (LAN) devices, cellular telephone devices, etc., as well as an associated antenna 26 or antennas, as illustratively shown. By way of example, one or more phased array antennas (as well as other suitable antennas) may be used, as will be appreciated by those skilled in the art.

Referring again to FIGS. 1 and 2, it is shown that node Y is moving in the direction of arrow 16 among the nodes C, J, K, L, V, W and X within the network 10. At the moment illustrated in FIG. 1, node X's MPR spanning tree includes the X-Y-K branch leading to node C. Thus, when node C's view of the network topology is as shown in FIG. 1, node C will route to node X via the K-Y-X branch, i.e. backwards through that branch of node X's MPR spanning tree as indicated by the arrows 18.

FIG. 2 also shows part of node X's MPR spanning tree at a time later than that shown in FIG. 1 as node Y has moved in the direction of arrow 16. At this moment, because of a condition between the distribution, via node J, of the addition of node J as a new MPR for node Y, and the distribution, via node K, of the simultaneous drop of node K as node Y's MPR, conventional OLSR's reverse-MPR-spanning-tree routing mechanism can break down. For example, node C may process node K's drop notice before processing node J's add notice because there is an odd number of hops from J to C, or because of the relative phasing of each node's OLSR timers.

Figure 4:
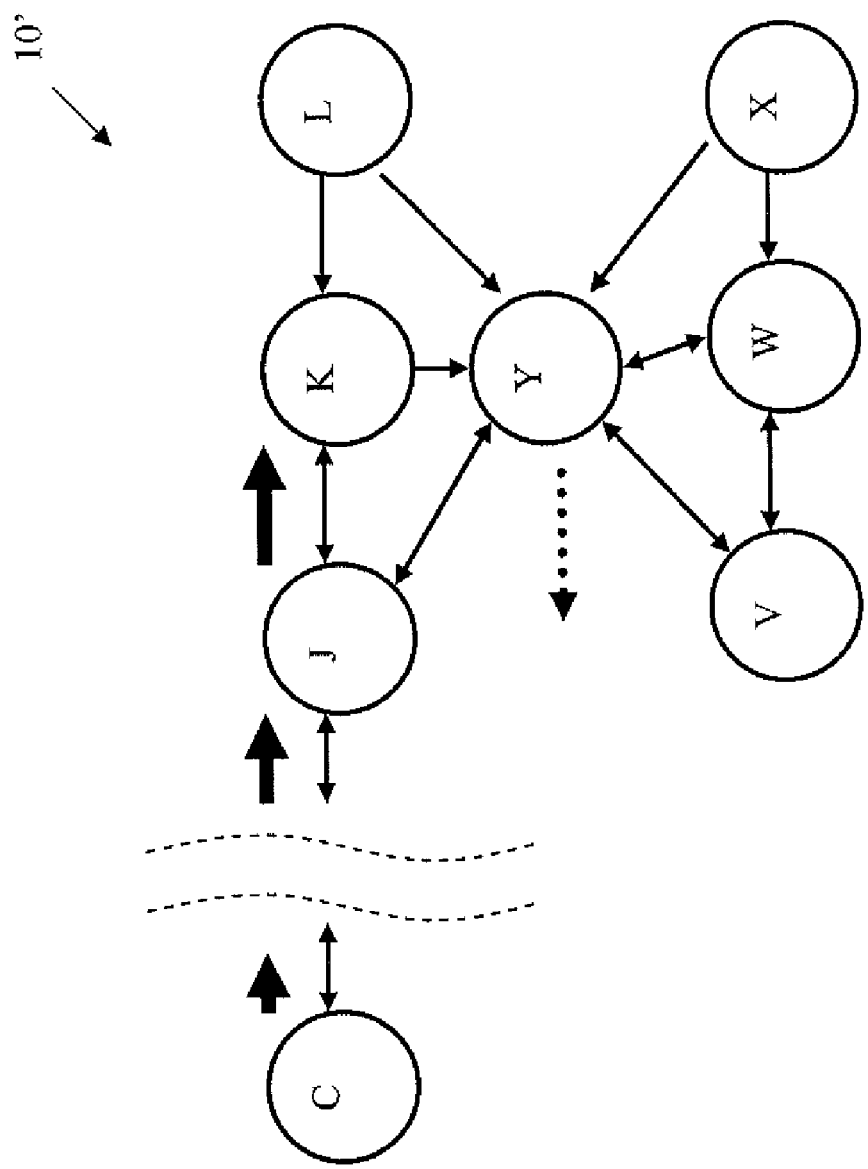
FIG. 4 is a schematic snapshot view of an ad-hoc network, at the same point in time as FIG. 2, but operating under a conventional OLSR protocol.

In other words, as illustrated in FIG. 4, in a network 10' operating under the conventional OLSR protocol, from node C's point of view, there would be no reverse MPR spanning tree to node X.

Note that K and Y maintain OLSR neighbor connectivity throughout the period of interest. Thus, the K-Y connection constantly possesses the underlying connectivity necessary to provide a route to Y (and through Y to the lower half of the network including node V, W and X) throughout the period of interest. But because conventional OLSR's standard routecalculation algorithm constrains routes to follow reverse MPR-spanning-trees, routes flowing through MPR-spanning-tree leaves (and other MPR-spanning-tree forward-connection links) are excluded.

Not using C-...-J-K-Y nor C-...-J-K-L-Y routes to node Y, when the underlying connectivity supports them, and they are the only way to route to the destination, is a problem. Moreover, were either of these routes to be generated and used, this particular route-drop would not occur. Thus, the symmetric OLSR protocol described herein provides for MPR-spanning-tree links to be used in either direction (forwards or backwards along a destination's MPR spanning tree links).

So, in FIG. 2, in accordance with the symmetric OLSR protocol, it is shown that the reverse MPR spanning tree routing constraint of conventional OLSR has been relaxed and use is made of all available 1-hop neighbor links. Now, node C can reach nodes Y and X as well as nodes V and W by using the symmetric OLSR approach for route calculation. Node C, at or about the moment illustrated in FIG. 2, will add node Y to its route table, reflecting the route C, ... I, J, K, Y using node K, and its forward MPR spanning tree root selector node to MPR link, as an interior node in the route.

Thus, the method of operating an ad-hoc network 10 including a plurality of wireless nodes 12, includes operating the wireless nodes 12 using a routing protocol, such as OLSR, wherein the wireless nodes implicitly store forward multipoint relay (MPR) spanning tree routes in a distributed fashion and reverse MPR spanning tree routes in an explicit fashion, and wherein a first wireless node, e.g. node C, communicates with a second wireless node, e.g. node X, using a reverse MPR spanning tree route, e.g. route 18 in FIG. 1. The method further includes determining whether the reverse MPR spanning tree route has become unavailable between the first and second wireless nodes and that no other reverse MPR spanning tree route has yet become available, and, if so, using an MPR spanning tree route, e.g. route 19 in FIG. 2, that includes at least a portion of a forward MPR spanning tree segment, e.g., the hop from node K to node Y in FIG. 2, for communication between the first and second wireless nodes.

The wireless nodes 12 may add routes to one-hop neighbor nodes to a route table 28, and select one-hop neighbor nodes as MPRs to retransmit messages to two-hop neighbor nodes. Storing forward MPR spanning tree routes and reverse MPR spanning tree routes may further include adding new routes to the route table 28 based upon symmetric use of both MPR- and non-MPR-to-new-destination-node links.

Another aspect is directed to the ad-hoc network 10 including the plurality of wireless nodes 12. In the network 10, each wireless node illustratively comprises a controller 22 and a wireless communications device 20 cooperating therewith to operate the wireless node using a routing protocol, e.g. OLSR, including storing forward MPR spanning tree routes and reverse MPR spanning tree routes, and to communicate with the other wireless nodes 12 using reverse MPR spanning tree routes, and determining whether a respective reverse MPR spanning tree route, e.g. route 18, to another one of the plurality of wireless nodes, e.g. node X, has become unavailable, and, if so, using a MPR spanning tree route, e.g. route 19, that includes one or more forward MPR spanning tree links, e.g., the hop form node K to node Y in FIG. 2, for communication to such wireless node.

Another aspect is directed to a wireless node for operation with a plurality of mobile nodes 12 within the ad-hoc network 10. The wireless node may include a controller 22 and a wireless communications device 20 cooperating therewith to operate the wireless node using a routing protocol, e.g. OLSR, including storing forward MPR spanning tree routes and reverse MPR spanning tree routes, and to communicate with the other wireless nodes 12 using reverse MPR spanning tree routes, and determining whether a respective reverse MPR spanning tree route to another one of the plurality of wireless nodes has become unavailable, and, if so, using an MPR spanning tree route that includes one or more forward MPR spanning tree links for communication to such wireless node.

Reverse MPR spanning tree routing of OLSR works well when the network is stable, i.e. when the OLSR topology-distribution mechanism has converged so that each node in the network has the complete network level view of network topology. But during a period in which a node's local connectivity changes and MPR selection changes are being distributed across the network, problems can arise.

So, because of an interaction between the distribution of a node's addition as a new MPR and the distribution of a simultaneous node drop as an MPR, conventional OLSR's reverse-spanning-tree routing mechanism can break down. In other words, for various reasons, a node may happen to process a drop notice before processing an add notice. It is a problem to not use certain routes to a destination node when the underlying connectivity supports them, and especially when they are the only way to route to the destination node. Moreover, if these routes were to be generated and used, the particular route-drop shown in FIG. 4 when only reverse MPR spanning tree routing is used would not occur. Thus, providing OLSR route calculation to allow MPR spanning tree links to be used in either direction (forwards or backwards along a destination's MPR spanning tree links) in routes addresses this particular route-drop problem.

In an unchanging network (one in which nodes are either not moving, or where movement is limited so that no OLSR topology changes occur), no routes will be dropped or added because all OLSR network topology information has already been fully distributed across the network. However, when topology changes are ongoing, the standard OLSR protocol allows routes to be temporarily dropped, depending upon the phasing of the distribution of local topology changes across the network. Moreover, even when no nodes are moving, network topology can change due to the lossy nature of RF communication. These dropped routes will likely be rediscovered when the network again reaches stability, but during the transition they can be lost for 5 or 10 seconds, for example. Allowing routes to use MPR-spanning-tree links in either direction (as with the route through the K-Y link in FIG. 2), or include MPR-spanning-tree leaves as interior nodes in the route (as with a route through L in FIG. 2), will avoid route-dropping behavior caused by this route-computation constraint.

The approach described herein may be considered as differing from standard OLSR's reverse MPR spanning tree (RMST) routing when RMST fails. In other words, the approach may preferably activate when standard OLSR routing fails.

In OLSR, MPRs are only selected by a node when the two nodes are connected by a neighbor link. Neighbor links are symmetric in OLSR. A neighbor link being symmetric means that the selecting node can reach the selected MPR, and in addition, that the selected MPR can reach the selector. The OLSR route computation algorithm only uses one direction of the symmetric link, the MPR-to-selector-node direction, the reverse MPR-spanning-tree direction; it ignores the selector-node-to-MPR direction, the forward MPR-spanning-tree direction. Using only the MPR-to-selector-node direction for routing results in only routing backwards through the candidate destination node's MPR spanning tree during the route-building phase.

A generalized, more robust routing protocol is provided by the embodiments described herein. In a route induction phase of OLSR, new routes are added by allowing either direction of the MPR-to-intermediate-destination symmetric link to be used, as opposed to only the MPR-to-intermediate-destination direction. This works because the link is symmetric. It allows MPR spanning tree leaf nodes to become interior nodes in routes. This may be referred to as the symmetric OLSR routing algorithm (SORA) protocol.

An example of a suitable protocol may include the following steps, for example:

1. Start at the current (source) node, the route-builder, with an empty routing table.

2. Add length h=1 routes to the route-builder's 1-hop symmetric neighbors.

3. Add length h=2 routes to the route-builder's 2-hop neighbors (the route-builder's 1-hop symmetric neighbor's 1-hop symmetric neighbors that are not also the route-builder's 1-hop symmetric neighbors).

4. Add length h=h+1 routes to new destination nodes from existing length h destinations in two sequential steps.
   4.1. Add new length h+1 destinations that have selected a existing length h destination node as MPR, by adding an additional hop from an existing length h destination to the new length h+1 destination. [HC1]
   4.2. Add new length h+1 destinations that have been selected by a length h destination node as MPR, by adding a last hop from the previous length h destination to the new length h+1 destination.

5. Repeat step 4 until no new routes are added.

In the induction step (step 4), after selector nodes that can be reached by their MPRs are added (a reverse spanning tree routing step), MPRs that can be reached by their selectors (a forward spanning tree routing step) are also added, allowing MPR spanning tree leaf-only nodes, and other forward-MPR-spanning-tree root links, to participate as interior route nodes. This is useful when network topology is in transition, i.e., when a destination's MPR spanning tree is temporarily broken.

As with conventional OLSR, longer routes will only be used when no shorter route can reach the destination node, based upon the route-constructing node's current notion of network topology. However, differently than conventional OLSR, forward-spanning-tree links can now be used to build routes after all reverse-spanning-tree next-step links have been added for a particular number of hops (h). When network topology is in flux, the route-constructing node's current notion of network topology may be flawed to some degree (i.e. it will differ from the current instantaneous network level view of network topology). However, that should not be a problem provided underlying connectivity to the ultimate destination continues to exist, e.g., the network does not bifurcate or the destination node does not drop out of the network.

Various tests implementing the approach described herein reduced the number of route drops by over 75%, e.g. from 1107 to 261, for sample use case scenarios including node movement. The maximum time traffic was not route-able from any source node to a single destination node dropped from 45.7 seconds to 4.9 seconds. The maximum duration of a single route drop fell from 10.0 seconds to 3.0 seconds. Route drop events cluster into drop groups, in which multiple drops at a particular source node to one or more destination nodes occur together. In the tests, the number of drop groups fell from 120 to 27. Thus, the symmetric OLSR approach of the present invention was effective in reducing unnecessary route drops caused by the interaction between distribution-of-topology-change-information race conditions and exclusively routing via the destination's reverse MPR spanning tree.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of operating an ad-hoc network including a plurality of wireless nodes, the method comprising:
    operating the wireless nodes using a routing protocol wherein the wireless nodes store forward multi-point relay (MPR) spanning tree routes and reverse MPR spanning tree routes, and wherein a first wireless node communicates with a second wireless node using a reverse MPR spanning tree route; and
    determining whether the reverse MPR spanning tree route has become unavailable between the first and second wireless nodes and that no other reverse MPR spanning tree route has yet become available, and, if so, using at least portions of a forward MPR spanning tree route for communication between the first and second wireless nodes.

2. The method according to claim 1 wherein storing forward MPR spanning tree routes and reverse MPR spanning tree routes comprises adding routes to one-hop neighbor nodes to a route table.

3. The method according to claim 2 wherein storing forward MPR spanning tree routes and reverse MPR spanning tree routes further comprises selecting one-hop neighbor nodes as MPRs to retransmit messages to two-hop neighbor nodes.

4. The method according to claim 3 wherein storing forward MPR spanning tree routes and reverse MPR spanning tree routes further comprises adding new routes to the route table based upon symmetric use of MPR-to-new-destination-node links.

5. The method according to claim 1 wherein the wireless routing protocol comprises an optimized link state routing (OLSR) protocol.

6. A method of operating an ad-hoc network including a plurality of wireless nodes, the method comprising:
    operating the wireless nodes using an optimized link state routing (OLSR) protocol wherein the wireless nodes store forward multi-point relay (MPR) spanning tree routes and reverse MPR spanning tree routes by adding new routes to a route table based upon symmetric use of MPR-to-new-destination-node links, and wherein a first wireless node communicates with a second wireless node using a reverse MPR spanning tree route; and
    determining whether the reverse MPR spanning tree route has become unavailable between the first and second wireless nodes, and, if so, using at least portions of a forward MPR spanning tree route for communication between the first and second wireless nodes.

7. The method according to claim 6 wherein adding new routes comprises each wireless node adding routes to one-hop neighbor nodes to the route table.

8. The method according to claim 7 wherein adding new routes further comprises each wireless node selecting one-hop neighbor nodes as MPRs to retransmit messages to two-hop neighbor nodes.

9. An ad-hoc network comprising:
    a plurality of wireless nodes, each wireless node comprising a controller and a wireless communications device cooperating therewith to
        operate the wireless node using a routing protocol including storing forward multi-point relay (MPR) spanning tree routes and reverse MPR spanning tree routes, and to communicate with the other wireless nodes using reverse MPR spanning tree routes, and
        determine whether a respective reverse MPR spanning tree route to another one of the plurality of wireless nodes has become unavailable, and, if so, using at least portions of a forward MPR spanning tree route for communication to such wireless node.

10. The ad-hoc network according to claim 9 wherein the controller and wireless communications device cooperate to add routes to one-hop neighbor nodes to a route table.

11. The ad-hoc network according to claim 10 wherein the controller and wireless communications device further cooperate to select one-hop neighbor nodes as MPRs to retransmit messages to two-hop neighbor nodes.

12. The ad-hoc network according to claim 11 wherein the controller and wireless communications device further cooperate to add new routes to the route table based upon symmetric use of MPR-to-new-destination-node links.

13. The ad-hoc network according to claim 9 wherein the wireless routing protocol comprises an optimized link state routing (OLSR) protocol.

14. A wireless node for operation in a plurality of mobile nodes within an ad-hoc network, the wireless node comprising:
    a controller and a wireless communications device cooperating therewith to
        operate the wireless node using a routing protocol including storing forward multi-point relay (MPR) spanning tree routes and reverse MPR spanning tree routes, and to communicate with the other wireless nodes using reverse MPR spanning tree routes, and
        determining whether a respective reverse MPR spanning tree route to another one of the plurality of wireless nodes has become unavailable, and, if so, using at least portions of a forward MPR spanning tree route for communication to such wireless node.

15. The wireless node according to claim 14 wherein the controller and wireless communications device cooperate to add routes to one-hop neighbor nodes to a route table.

16. The wireless node according to claim 15 wherein the controller and wireless communications device further cooperate to select one-hop neighbor nodes as MPRs to retransmit messages to two-hop neighbor nodes.

17. The wireless node according to claim 16 wherein the controller and wireless communications device further cooperate to add new routes to the route table based upon symmetric use of MPR-to-new-destination-node links.

18. The wireless node according to claim 14 wherein the wireless routing protocol comprises an optimized link state routing (OLSR) protocol.

* * * * *